US009836340B2

(12) United States Patent
Bello et al.

(10) Patent No.: US 9,836,340 B2
(45) Date of Patent: Dec. 5, 2017

(54) SAFE MANAGEMENT OF DATA STORAGE USING A VOLUME MANAGER (75) Inventors: Adenkunle Bello, Pflgerville, TX (US); Radhika Chirra, Cedar Park, TX (US); Anil Kumar Kaniveedu Damodaran, Cedar Park, TX (US); Rakesh Thoutem, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1149 days.

(21) Appl. No.: 13/251,752

(22) Filed: Oct. 3, 2011

(65) Prior Publication Data

US 2013/0086318 A1    Apr. 4, 2013

(51) Int. Cl.
*G06F 12/08* (2016.01)
*G06F 12/0808* (2016.01)
*G06F 12/0815* (2016.01)
*G06F 11/07* (2006.01)

(52) U.S. Cl.
CPC ................................ *G06F 11/0727* (2013.01)

(58) Field of Classification Search
CPC ............ G06F 11/0727; G06F 11/0748; G06F 11/0775; G06F 3/0638; G06F 3/0643; G06F 3/0644; G06F 9/5011; G06F 9/5072; G06F 9/5088
See application file for complete search history.

(56) References Cited

U.S. PATENT DOCUMENTS

| 6,343,324 | B1* | 1/2002 | Hubis et al. ................. 709/229 |
| 6,574,705 | B1* | 6/2003 | Peloquin ............... G06F 3/0601 707/999.202 |
| 6,665,675 | B1 | 12/2003 | Mitaru |
| 6,665,786 | B2 | 12/2003 | McMichael et al. |
| 6,782,410 | B1* | 8/2004 | Bhagat .................. G06F 9/5027 709/201 |
| 6,842,377 | B2* | 1/2005 | Takano ................ G11C 7/1021 365/185.21 |
| 7,017,011 | B2* | 3/2006 | Lesmanne ............. G06F 12/082 711/141 |

(Continued)

OTHER PUBLICATIONS

IBM, Application No. GB1217268.0, May 21, 2013.

(Continued)

*Primary Examiner* — Mohamed Gebril
(74) *Attorney, Agent, or Firm* — Garg Law Firm, PLLC; Rakesh Garg; Issac Gooshaw (57) ABSTRACT A method, system, and computer program product for safe management of data storage using a VM are provided in the illustrative embodiments. An I/O request is received from the VM. A determination is made whether the I/O request requests a data manipulation on the data storage in an address range that overlaps with an address range of a VM signature stored on the data storage. In response to determining that the address range of the data manipulation overlaps with the address range of the VM signature, a determination is made whether an identifier of the VM matches an identifier of a second VM associated with the signature. In response to determining that the identifier of the VM does not match the identifier of the second VM, the I/O request is failed, thereby preventing an unsafe overwriting of the signature on the data storage.

20 Claims, 7 Drawing Sheets

(56) References Cited

U.S. PATENT DOCUMENTS

| | | | |
|---|---|---|---|
| 7,196,942 B2* | 3/2007 | Khurana | G11C 7/1051 326/38 |
| 7,269,715 B2* | 9/2007 | Le | G06F 9/3802 712/215 |
| 7,321,955 B2* | 1/2008 | Ohmura | G06F 12/0804 711/113 |
| 7,340,578 B1 | 3/2008 | Khanzode | |
| 7,512,736 B1* | 3/2009 | Overby | G06F 3/0607 707/999.202 |
| 7,529,816 B2* | 5/2009 | Hayden et al. | 709/220 |
| 7,734,878 B1 | 6/2010 | Sharma et al. | |
| 7,831,769 B1* | 11/2010 | Wen et al. | 711/114 |
| 7,975,136 B1 | 7/2011 | Yin | |
| 8,230,193 B2* | 7/2012 | Klemm | G06F 3/0608 711/114 |
| 8,347,010 B1* | 1/2013 | Radovanovic | G06F 13/38 710/2 |
| 8,443,166 B2* | 5/2013 | Czezatke | G06F 11/1451 711/203 |
| 8,566,546 B1* | 10/2013 | Marshak | G06F 3/0604 711/112 |
| 8,984,031 B1* | 3/2015 | Todd | G06F 17/30091 707/823 |
| 8,990,527 B1* | 3/2015 | Linstead | G06F 3/0617 711/161 |
| 2003/0101160 A1 | 5/2003 | Seetharaman et al. | |
| 2004/0068621 A1* | 4/2004 | Van Doren | G06F 12/0828 711/144 |
| 2004/0088284 A1 | 5/2004 | Gourlay et al. | |
| 2005/0125607 A1* | 6/2005 | Chefalas | G06F 12/0862 711/113 |
| 2006/0059204 A1 | 3/2006 | Borthakur et al. | |
| 2007/0008328 A1* | 1/2007 | MacWilliams | G06F 12/0646 345/530 |
| 2008/0046997 A1 | 2/2008 | Wang | |
| 2009/0037682 A1* | 2/2009 | Armstrong | G06F 12/1475 711/164 |
| 2009/0094413 A1* | 4/2009 | Lehr | G06F 3/0605 711/112 |
| 2009/0204718 A1* | 8/2009 | Lawton et al. | 709/230 |
| 2009/0228648 A1* | 9/2009 | Wack | G06F 11/1092 711/114 |
| 2009/0271472 A1* | 10/2009 | Scheifler | G06F 9/485 709/202 |
| 2009/0282101 A1* | 11/2009 | Lim | G06F 9/5077 709/203 |
| 2010/0046267 A1* | 2/2010 | Yan | G11C 16/24 365/51 |
| 2010/0050016 A1* | 2/2010 | Franklin | G06F 11/0727 714/6.32 |
| 2010/0106926 A1* | 4/2010 | Kandasamy | G06F 12/1458 711/163 |
| 2010/0125712 A1* | 5/2010 | Murase | G06F 11/1458 711/162 |
| 2010/0332479 A1* | 12/2010 | Prahlad | G06F 17/302 707/741 |
| 2010/0332780 A1* | 12/2010 | Furuya | G06F 3/0689 711/162 |
| 2011/0066668 A1* | 3/2011 | Guarraci | G06F 17/30233 707/831 |
| 2011/0154103 A1* | 6/2011 | Bulusu | G06F 11/1658 714/6.23 |
| 2011/0202735 A1* | 8/2011 | Kono | G06F 11/1451 711/162 |
| 2011/0307745 A1* | 12/2011 | McCune | G06F 17/30221 714/54 |
| 2012/0095965 A1 | 4/2012 | Elron et al. | |
| 2012/0131232 A1* | 5/2012 | Brownlow | G06F 13/4221 710/10 |
| 2012/0198107 A1* | 8/2012 | McKean | G06F 13/18 710/40 |
| 2013/0007373 A1* | 1/2013 | Beckmann | G06F 12/126 711/136 |
| 2013/0046949 A1* | 2/2013 | Colgrove | G06F 3/0608 711/170 |
| 2013/0055253 A1* | 2/2013 | Jubran | G06F 9/455 718/1 |
| 2013/0067161 A1* | 3/2013 | Chandra | G06F 13/12 711/114 |
| 2013/0080805 A1* | 3/2013 | Vick | G06F 8/4432 713/320 |
| 2013/0086268 A1* | 4/2013 | Sloma | G06F 9/455 709/226 |
| 2013/0111129 A1* | 5/2013 | Maki | G06F 3/0611 711/117 |
| 2013/0152097 A1* | 6/2013 | Boctor | G06F 9/505 718/103 |
| 2013/0326270 A1* | 12/2013 | Chen | G06F 11/2089 714/6.21 |
| 2014/0003114 A1* | 1/2014 | Pellizzer | H01L 27/2481 365/63 |

OTHER PUBLICATIONS

IBM, Application No. GB1217268.0, Jun. 6, 2013.
IBM, Patent Act 1977: Examination report under section 18(3), Application No. GB1217268.0, dated Jun. 4, 2013.
IBM, Application No. GB1217268.0, Cover letter to UK Intellectual Property Office, dated Aug. 1, 2013.
IBM, Application No. GB1217268.0, Response to Examination report under section 18(3), dated Jul. 22, 2013.
Littlejohn Shinder et al., MCSA MCSE, Jul. 18, 2017.
Massiglia; Highly Available Storage for Windows Servers, Jul. 18, 2017.

* cited by examiner

SAFE MANAGEMENT OF DATA STORAGE USING A VOLUME MANAGER

TECHNICAL FIELD

The present invention relates generally to a method, system, and computer program product for a reliable data storage management. More particularly, the present invention relates to a method, system, and computer program product for safe management of a data storage system using a volume manager.

BACKGROUND

In a data processing environment, data is stored on a variety of data storage devices. For example, presently, data is stored on a set of magnetic hard disks, magnetic tape drives, optical data storage devices, solid-state memories, and many other types of data storage devices.

In certain data processing environments, several data processing systems may access a data storage unit. For example, several host computers, or nodes, may access a storage area network (SAN), the SAN including a combination of data storage devices. In certain other data processing environments, different applications in a data processing system may access different portions of a data storage associated with the data processing system.

Typically, an application executing on a data processing system accesses a logical view of certain data storage that is available to the application, the data processing system, or both. For example, a one Terabyte (TB) data storage unit, such as a SAN, may be a combination of several hard disks of two Gigabytes (GB) capacity each. A node or an application executing thereon may not have access to the entire 1 TB SAN, but to a portion, for example, 10 GB, thereof. From the point of view of the node and the application executing thereon, the data storage available to it is of size 10 GB, and not 1 TB.

Such a view of data storage, as in this example, is called a volume, a logical volume, or a logical unit, and has an identifier called Logical Unit Number (LUN) associated therewith. As one example, a LUN may represent all or a portion of a data storage device. In another example, a LUN may represent a combination of two or more portions of one or more data storage devices.

A volume manager is an application that manages read/write access to one or more LUNs. A volume manager is also known as a logical volume manager (LVM). An LVM can manage read/write access to more than one LUNs for one data processing system, or for more than one node, such as in a cluster of nodes in a high availability configuration.

SUMMARY

The illustrative embodiments provide a method, system, and computer program product for safe management of data storage using a volume manager.

In at least one embodiment, a method for safe management of a data storage using a volume manager (VM) is provided. The method includes a computer receiving an I/O request from the VM. The method further includes the computer determining whether the I/O request requests a data manipulation on the data storage in an address range that overlaps with an address range of a VM signature stored on the data storage. The method further includes the computer, responsive to determining that the address range of the data manipulation overlaps with the address range of the VM signature, determining whether an identifier of the VM matches an identifier of a second VM associated with the signature. The method further includes the computer, responsive to determining that the identifier of the VM does not match the identifier of the second VM, failing the I/O request, thereby preventing an unsafe overwriting of the VM signature on the data storage.

In at least one embodiment, a computer program product for safe management of a data storage using a volume manager (VM) is provided. The computer program product includes one or more computer-readable tangible storage devices. The computer program product further includes program instructions, stored on at least one of the one or more storage devices, to receive an I/O request from the VM. The computer program product further includes program instructions, stored on at least one of the one or more storage devices, to determine whether the I/O request requests a data manipulation on the data storage in an address range that overlaps with an address range of a VM signature stored on the data storage. The computer program product further includes program instructions, stored on at least one of the one or more storage devices, to, responsive to determining that the address range of the data manipulation overlaps with the address range of the VM signature, determine whether an identifier of the VM matches an identifier of a second VM associated with the signature. The computer program product further includes program instructions, stored on at least one of the one or more storage devices, to, responsive to determining that the identifier of the VM does not match the identifier of the second VM, fail the I/O request, thereby preventing an unsafe overwriting of the VM signature on the data storage.

In at least one embodiment, a computer system for safe management of a data storage using a volume manager (VM) is provided. The computer system includes one or more processors, one or more computer-readable memories and one or more computer-readable tangible storage devices. The computer system further includes program instructions, stored on at least one of the one or more storage devices for execution by at least one of the one or more processors via at least one of the one or more memories, to receive an I/O request from the VM. The computer system further includes program instructions, stored on at least one of the one or more storage devices for execution by at least one of the one or more processors via at least one of the one or more memories, to determine whether the I/O request requests a data manipulation on the data storage in an address range that overlaps with an address range of a VM signature stored on the data storage. The computer system further includes program instructions, stored on at least one of the one or more storage devices for execution by at least one of the one or more processors via at least one of the one or more memories, to, responsive to determining that the address range of the data manipulation overlaps with the address range of the VM signature, determine whether an identifier of the VM matches an identifier of a second VM associated with the signature. The computer system further includes program instructions, stored on at least one of the one or more storage devices for execution by at least one of the one or more processors via at least one of the one or more memories, to, responsive to determining that the identifier of the VM does not match the identifier of the second VM, fail the I/O request, thereby preventing an unsafe overwriting of the VM signature on the data storage.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of illustrative embodiments when read in conjunction with the accompanying drawings, wherein:

DETAILED DESCRIPTION

A volume manager (VM) writes a signature—unique data of a certain type and size—to a LUN that the VM manages. The VM writes the signature at a specific location on the LUN, such as using a specific address or specific sectors.

A variety of volume managers is available from several manufacturers. The illustrative embodiments recognize that different VMs can, and often do, write different signatures. For example, one VM writes a signature that is 128 bits of a specific bit-pattern, and another VM writes a different bit pattern of 256 bits. Furthermore, one VM may write the signature at one location and another VM may write the signature at a different location.

The illustrative embodiments recognize that under certain circumstances, more than one VM can attempt to access a LUN. Particularly, the illustrative embodiments recognize that more than one VM writing their respective signatures to a common LUN can give rise to signature corruption.

For example, a VM may already be managing a LUN that represents a set of disks. An administrator may attempt to install a second VM to manage certain disks in the set of disks directly. Because a standard form, size, or location of signature is not used by the presently available VMs, it is likely that while the second VM is writing the second VM's signature, the second VM may overwrite all or part of the first signature written by the first VM.

The illustrative embodiments recognize that with distributed data processing environment and the use of SANs, same LUNs can be visible from several nodes in the data processing environment. Such conditions give rise to an increased possibility of different administrators of different nodes mistakenly assigning a common LUN to different VMs, which can write their respective signatures to the LUN and corrupt existing VM signatures thereon. A corrupted signature on a LUN disrupts the corresponding VM's access to the associated data storage unit. Disruption of access to a data storage unit can cause applications and systems to fail or even shutdown. Therefore, the illustrative embodiments recognize that such disruptions are undesirable in a data processing environment.

The illustrative embodiments used to describe the invention generally address and solve the above-described problems and other problems related to data storage management using a VM. The illustrative embodiments provide a method, system, and computer program product for safe management of data storage using more than one VMs.

Generally, an embodiment of the invention provides a process of preventing a potential overwrite of a VM signature by another VM that manages a common LUN. Generally, for a given LUN, an embodiment tracks the locations of the signatures written by various VMs. When a VM attempts to write to a location on the LUN where a signature (of another VM) is stored, the embodiment blocks the write operation, thus preventing corruption of the existing signature.

The illustrative embodiments are described with respect to certain data and data structures only as examples. Such descriptions are not intended to be limiting on the invention. For example, an illustrative embodiment described with respect to a particular data structure of a table for storing the VM signature information can be implemented with additional or different attributes, or in a form different than a table within the scope of the illustrative embodiments.

Furthermore, the illustrative embodiments may be implemented with respect to any type of data, data source, or access to a data source over a data network. Any type of data application or storage device may provide the data, such as data via a LUN, to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle Corporation and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, designs, architectures, layouts, schematics, and tools only as examples and are not limiting on the illustrative embodiments. Furthermore, the illustrative embodiments are described in some instances using particular software and data processing environments only as an example for the clarity of the description. The illustrative embodiments may be used in conjunction with other comparable or similarly purposed structures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
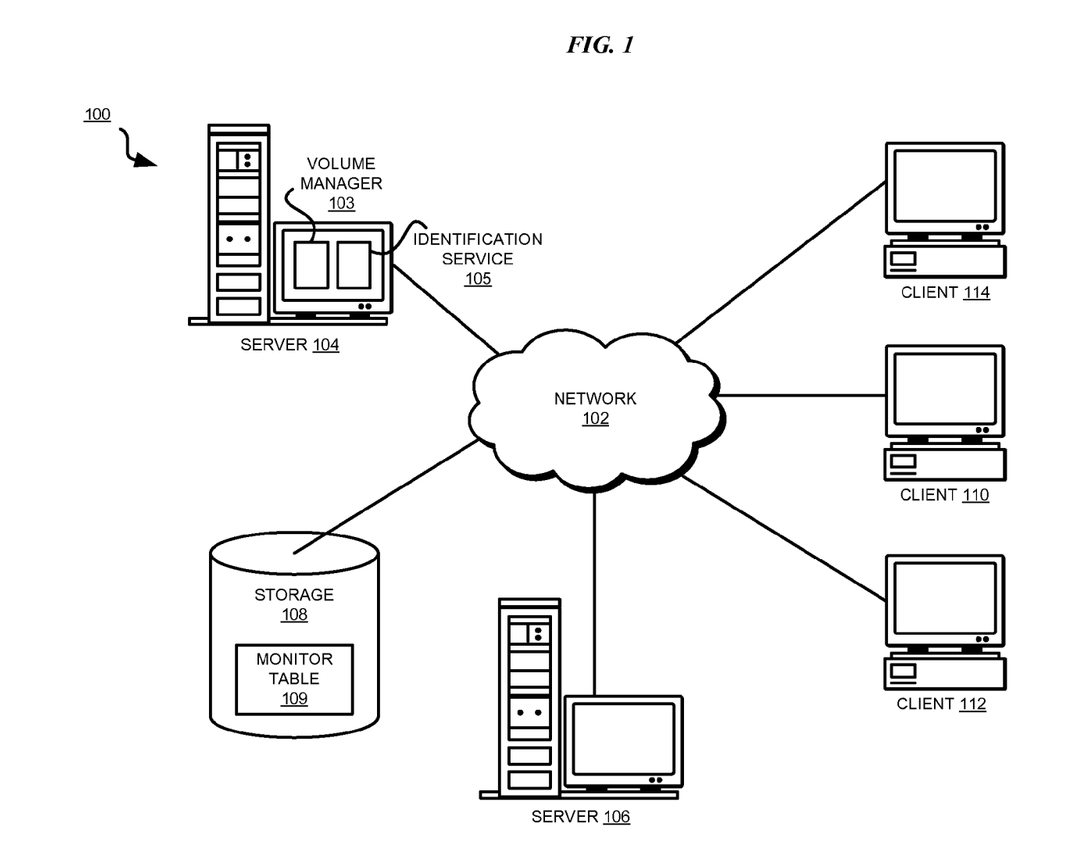
FIG. 1 depicts a pictorial representation of a network of data processing systems in which illustrative embodiments may be implemented.
Figure 2:
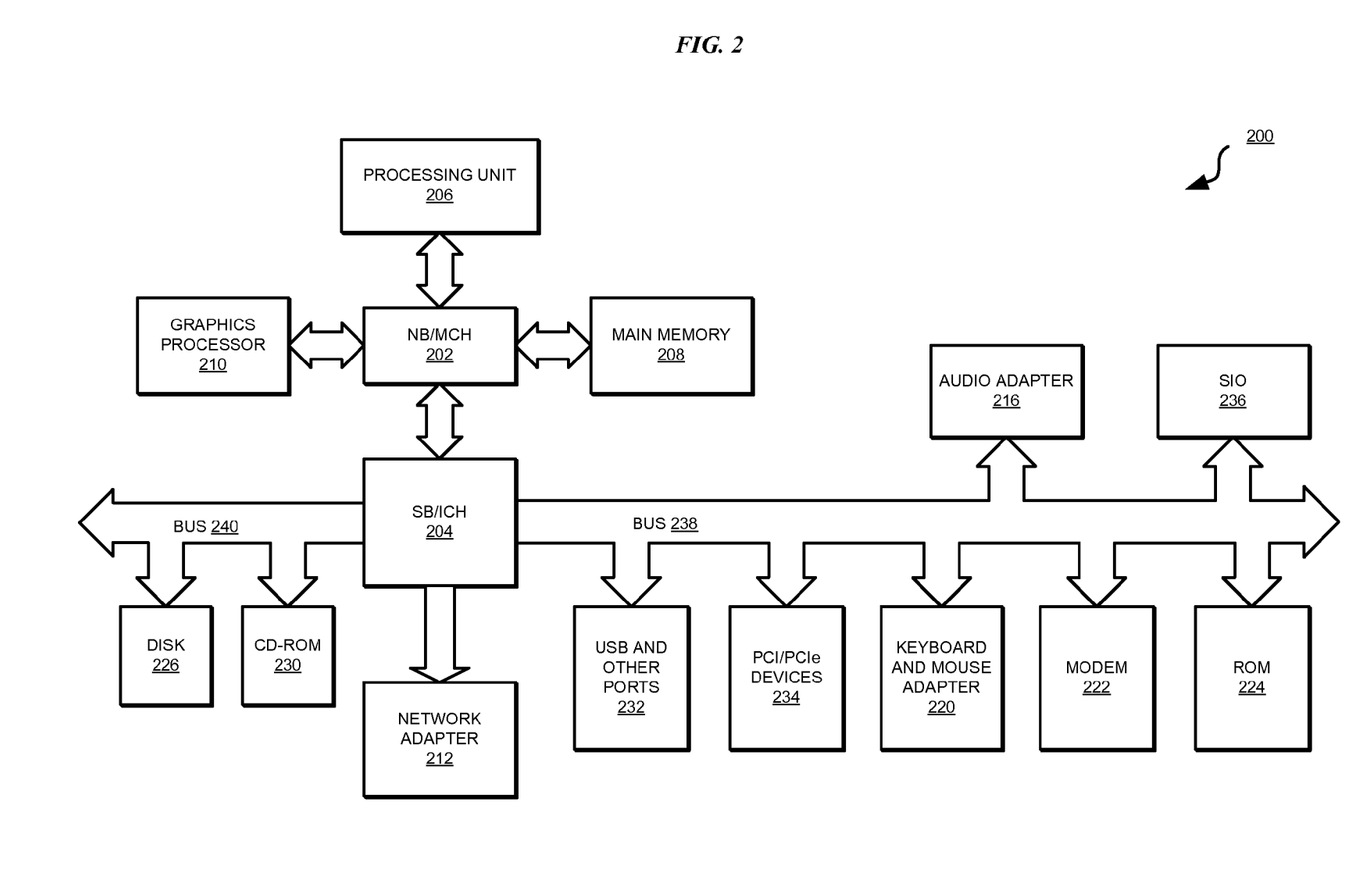
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

As an example, server 104 includes distributed volume manager 103. VM 103 is an example VM that writes a signature to a LUN that represents a part of storage unit 108. Identification service 105 is an example implementation of an embodiment described herein. Monitor table 109 is an example table-based implementation of signature metadata used in conjunction with an embodiment as described herein. Signature metadata is information about a VM signature. For example, in one embodiment, signature metadata occupies a row of monitor table 109, and includes an identifier of the LUN on which the signature is stored, an identifier of a VM that manages that LUN, a beginning address or location of the signature on the LUN, a length of that signature, an address offset for that signature, and one or more node identifiers from where the VM can manage the LUN.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may include one or more processors and may be implemented using one or more heterogeneous processor systems. Graphics processor 210 may be coupled to NB/MCH 202 through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204 through bus 238.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs, such as volume manager 103 and identification service 105 of FIG. 1, are located on one or more storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
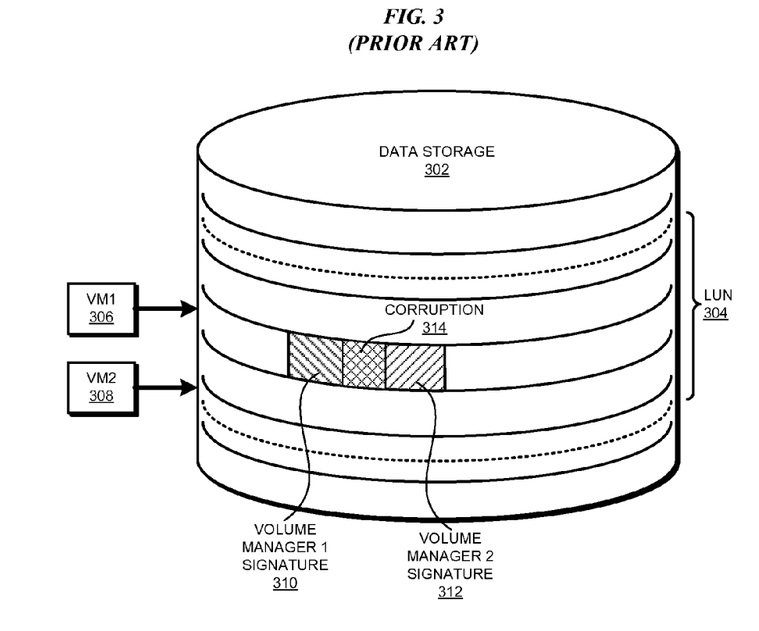
FIG. 3 (prior art) depicts a block diagram of an unsafe data storage management using multiple VMs, which can be improved using an illustrative embodiment.

With reference to FIG. 3, this figure depicts a block diagram of an unsafe data storage management using multiple VMs, which can be improved using an illustrative embodiment. Data storage 302 is similar to storage unit 108 in FIG. 1 and can include any number and types of data storage devices without limitation. LUN 304 represents a portion of data storage 302 that appears as a volume to volume managers. VM 306 labeled "VM1" is one VM that manages LUN 304. VM 308 labeled "VM2" is another VM that can view LUN 304.

VM 306 has a corresponding signature stored on LUN 304 as signature 310. VM 308 writes a corresponding signature on LUN 304 as signature 312. The storing of signatures 310 and 312 as shown causes an unsafe use of LUN 304 because of signature corruption 314 that occurs due to a complete or partial overwriting of signature 310 by signature 312. The management of LUN 304 is unsafe because neither VM 306 nor VM 308 can reliably access LUN 304 due to signature corruption 314.

Figure 4:
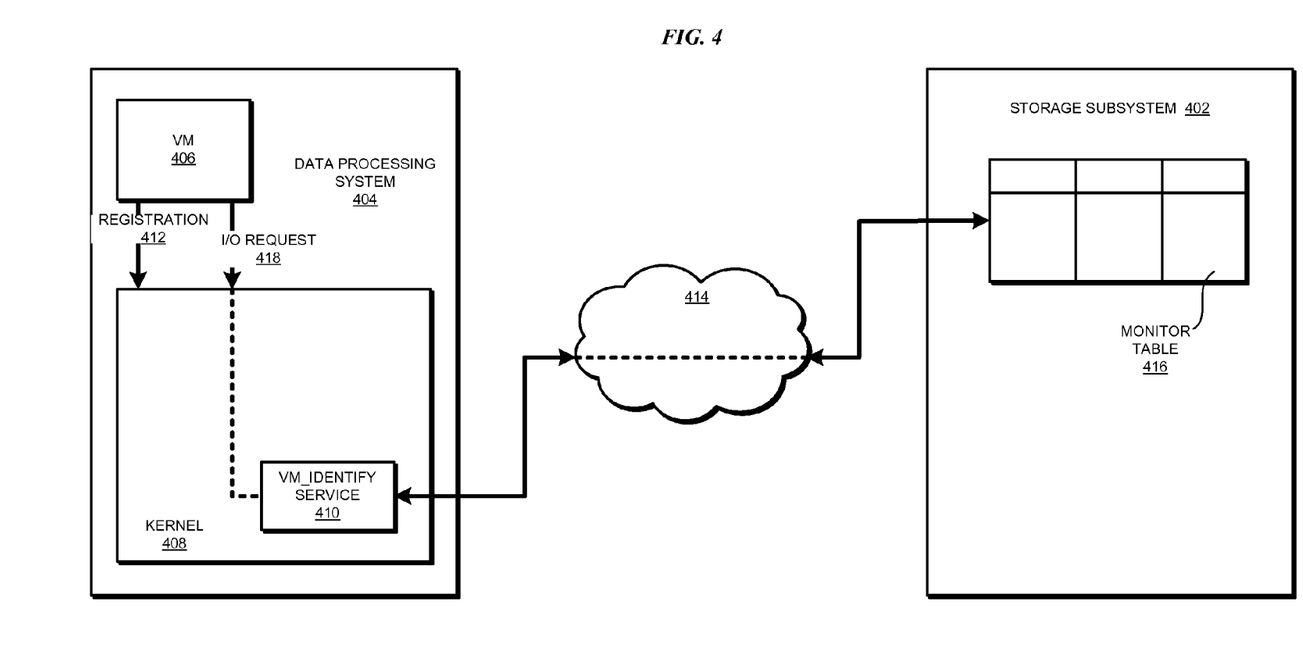
FIG. 4 depicts a block diagram of a process for safe management of data storage using several VMs in accordance with an illustrative embodiment.

With reference to FIG. 4, this figure depicts a block diagram of a process for safe management of data storage using several VMs in accordance with an illustrative embodiment. Storage subsystem 402 is a component for controlling access to a data storage, such as to data storage 302 in FIG. 3. In one embodiment, storage subsystem 402 is a device driver, whether actual or virtual, for accessing a data storage volume, such as a LUN. In another embodiment, storage subsystem 402 is a disk controller firmware. Generally, storage subsystem 402 can take the form of software, hardware, or a combination thereof, and can be located proximate to a corresponding data storage device or anywhere in a data network within the scope of the illustrative embodiments.

Data processing system 404 is a node on which VM 406 executes. In one embodiment, data processing system 404 is a standalone data processing system. In another embodiment, data processing system 404 is a node in a cluster, such that VM 406 can execute on any other node in the cluster.

Kernel 408 is the operating system kernel in data processing system 404. Among other services, kernel 408 provides I/O services to VM 406 and other applications executing on data processing system 404.

Service 410 is an embodiment of a VM identification service, such as identification service 105 of FIG. 1. Only as an example, and without implying any limitation of implementation in this form, service 410 is a kernel-level service, such as other I/O related services. For example, in one embodiment, service 410 is a kernel extension device driver. In another embodiment, service 410 is a function in a library called from a device driver. In another embodiment, service 410 is an application extension for kernel 408. Those of ordinary skill in the art will be able to conceive other implementations of the features of service 410 and the same are contemplated within the scope of the illustrative embodiments.

When VM 406 is instantiated, created, or executed on data processing system 404, VM 406 registers with kernel 408. Registration 412 is any suitable process of identifying VM 406 to kernel 408. VM 406 can register using an interface provided from service 410 for registration 412.

According to an embodiment, registration 412 is received by service 410 and includes information about VM 406's signature. In one embodiment, registration 412 includes information that allows service 410 to know the size and location of the signature that VM 406 writes to a LUN. For example, registration 412 includes a starting address and a size of VM 406's signature. In another example, registration 412 can includes an address, a size, and an offset used for storing VM 406's signature. In another embodiment, registration 412 can also, optionally, include a form of VM 406's signature, such as the signature bit-pattern, so as to be locatable by the signature's form instead of or in addition to being locatable by address or offset.

In an embodiment, registration 412 includes an identifier of VM 406, an identifier of data processing system 404, and an identifier of a LUN that VM 406 intends to manage. Additional attributes can be added to registration 412 according to a specific implementation within the scope of the illustrative embodiments. For example, VM 406 can further indicate in registration 412 that VM 406 is executing on a virtual machine, or has additional, fewer, or different privileges for managing the LUN.

Service 410 communicates over network 414 with storage subsystem 402, which manages table 416. Communication over network 414 can take any suitable form, such as TCP/IP communication.

Table 416 is called a "monitor table" and is a table data structure only for the clarity of the description and not as a limitation on an embodiment. Table 416 includes signature metadata for the LUNs within the scope of storage subsystem 402. Table 416 includes one or more rows of signature metadata, which includes information available from registration 412. In one embodiment, a row in table 416 includes an identifier of the LUN on which a VM signature of VM 406 is stored, an identifier of VM 406 that manages that LUN, a beginning address or location of the signature on the LUN, a length of that signature, an address offset for that signature, and one or more node identifiers, such as an identifier of data processing system 404, from where VM 406 can manage the LUN.

In an example operation according to an embodiment, VM 406 sends I/O request 418 to a device driver in kernel 408. The device driver calls service 410, which determines whether I/O request 418 can alter a signature on the LUN to which I/O request 418 is directed. As an example, service 410 determines whether I/O request 418 can alter a signature on the LUN by determining an address range that is affected by I/O request 418 and comparing the address range with the signature address range based on one or more rows of information from table 416. If the two address ranges overlap, I/O request 418 alters one or more signatures on the LUN. If no overlap exists, I/O request 418 can be processed normally.

Not all alterations of signatures are unsafe activities. For example, a VM can overwrite its own signature without making data storage management unsafe. For example, if I/O request 418 does alter a signature on the LUN, service 410 determines whether VM 406 is the VM that is identified as the manager of the LUN in question.

Under certain circumstances, a VM can accidentally overwrite its own signature, which can cause unsafe data storage operation. As an additional precaution, even VM 406 can be prevented from accidentally overwriting its own signature. In an embodiment, service 410 requires that I/O request 418 include an additional indicator that indicates an affirmative intention of VM 406 to overwrite its own signature. For example, I/O request 418 can include a flag "METADATA_CHANGE" that can be set to a particular value to indicate such affirmative intention. Service 410 can verify the presence of such an indication to determine whether to allow I/O request 418 to pass to the LUN or fail I/O request 418.

Generally, an embodiment imposes no restriction on which I/O requests should be examined in the manner of operation of FIG. 4. Without limitation, every I/O request directed to a LUN can be examined in this manner, albeit at a cost of reduced I/O performance.

In a preferred embodiment, only those I/O requests that include a metadata change flag or an equivalent thereof are sent to service 410. For example, a routine I/O request from an application in the application space may not even be aware of service 410 and may not include such a flag. Consequently, such I/O requests may pass normally without invoking service 410. VM 406 may be modified to perform registration 412 and include the flag in I/O request 418. Consequently, only certain I/O requests originating from VM 406 may be redirected to service 410, minimizing any performance degradation due to the use of service 410 and table 416.

Figure 5:
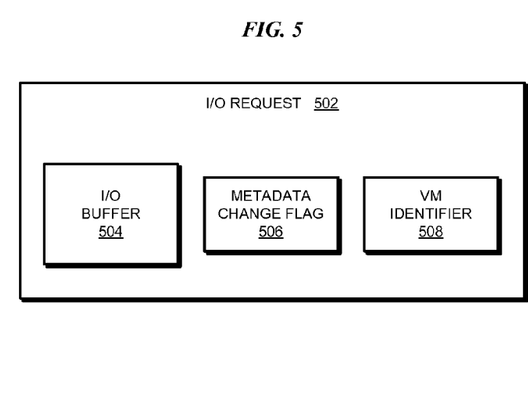
FIG. 5 depicts a block diagram of an example I/O request in accordance with an illustrative embodiment.

With reference to FIG. 5, this figure depicts a block diagram of an example I/O request in accordance with an illustrative embodiment. I/O request 502 is usable as I/O request 418 in FIG. 4.

I/O request 502 includes I/O buffer 504, which contains the information about the data sought to be changed on a given LUN. Metadata change flag 506 is an indicator to indicate an affirmative intention of the VM from where I/O request 502 is received to change the VM's signature on the LUN. VM identifier 508 identifies the VM from where I/O request 502 is received. Of course, within the scope of the illustrative embodiments, I/O request 502 can include additional attributes that are not shown in FIG. 5 for the clarity of the depiction. Metadata change flag 506, VM identifier, 508, and contents of I/O buffer 504 are used by a VM identification service as described with respect to service 410 of FIG. 4.

Figure 6:
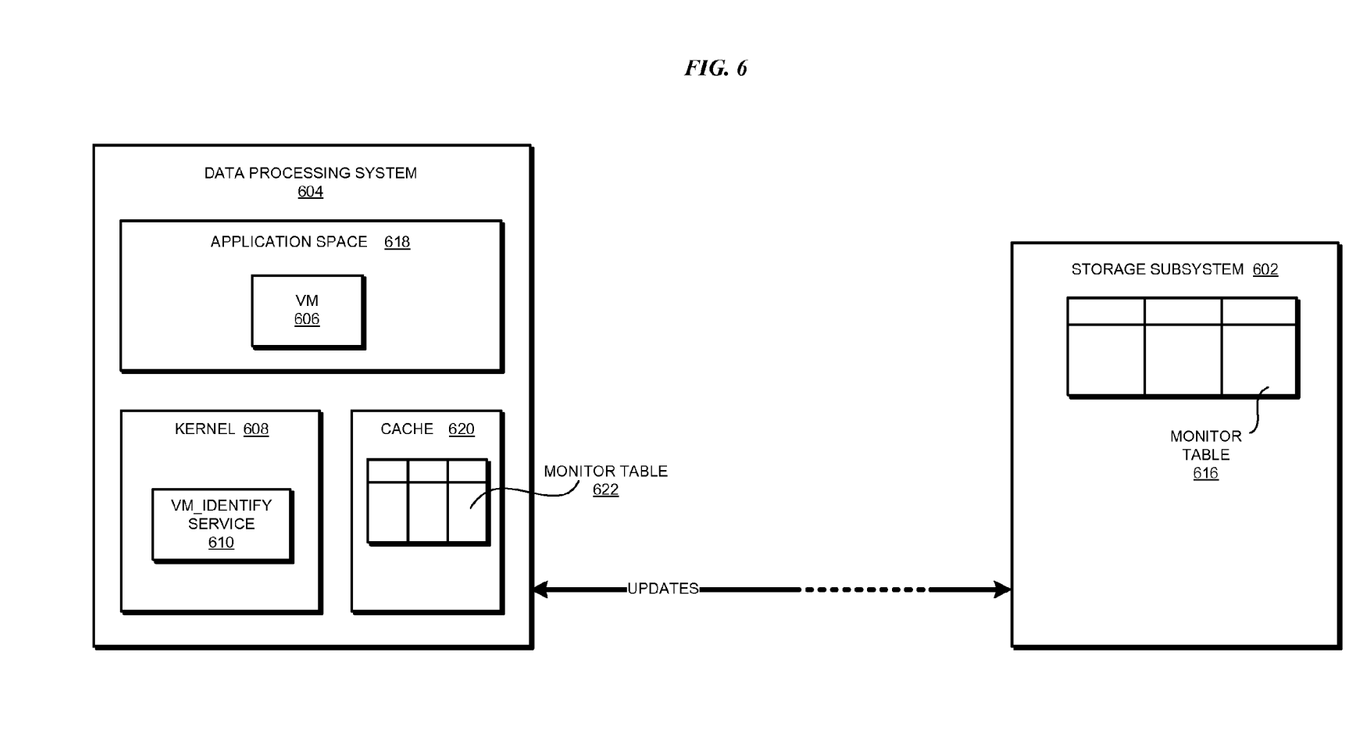
FIG. 6 depicts a block diagram of a modified process for safe management of data storage using several VMs in accordance with an illustrative embodiment.

With reference to FIG. 6, this figure depicts a block diagram of a modified process for safe management of data storage using several VMs in accordance with an illustrative embodiment. Storage subsystem 602, data processing system 604, kernel 608, service 610, and table 616 correspond to storage subsystem 402, data processing system 404, kernel 408, service 410, and table 416 respectively in FIG. 4.

In addition to kernel 608, data processing system 604 includes application space 618 in which VM 606 executes. Cache 620 is storage, such as a memory in data processing system 604, used by kernel 608 for reading/writing data used in kernel 608's operations.

According to an embodiment, cache 620 includes copy 622 of table 616. Copy 622 is copied from table 616 in storage subsystem 602 periodically or in response to certain events, and updated similarly thereafter. Referencing local data on data processing system 604 from service 610 is faster than checking data in table 616 on storage subsystem 602 under most common deployment scenarios. Copy 622 in cache 620 enables service 610 to determine whether an I/O request, such as I/O request 502 in FIG. 5, seeks to alter a signature on a LUN identified in table 616 by consulting table 622 instead of table 616, thereby improving the performance of I/O processing.

Figure 7:
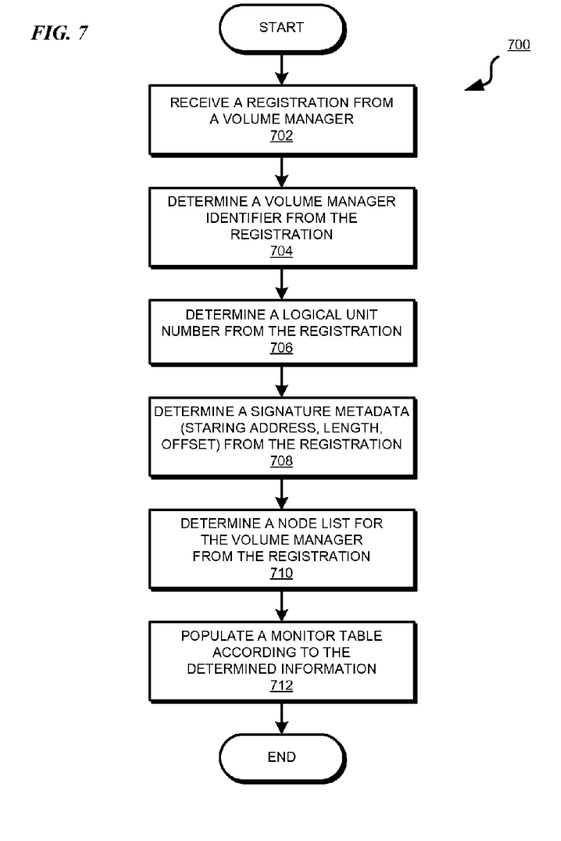
FIG. 7 depicts a flowchart of a registration process for safe management of data storage using a VM in accordance with an illustrative embodiment.

With reference to FIG. 7, this figure depicts a flowchart of a registration process for safe management of data storage using a VM in accordance with an illustrative embodiment. Process 700 can be implemented in a VM identification application, such as service 105 in FIG. 1, service 410 of FIG. 4, or service 610 in FIG. 6.

A VM identification application (service) receives a registration from a VM (block 702). The service determines a VM identifier from the registration (block 704). The service identifies a LUN from the registration (block 706).

The service further determines signature metadata from the registration, for example, starting address of a signature, a length of the signature, an offset of the signature, or a combination thereof (block 708). From the registration, the service can also identify one or more nodes (node list) from where the identified VM can manage the LUN (block 710).

The service populates a monitor table, such as table 109 in FIG. 1, table 416 in FIG. 4, or table 616 in FIG. 6, according to the information determined in blocks 704-708 (block 712). Process 700 ends thereafter.

Figure 8:
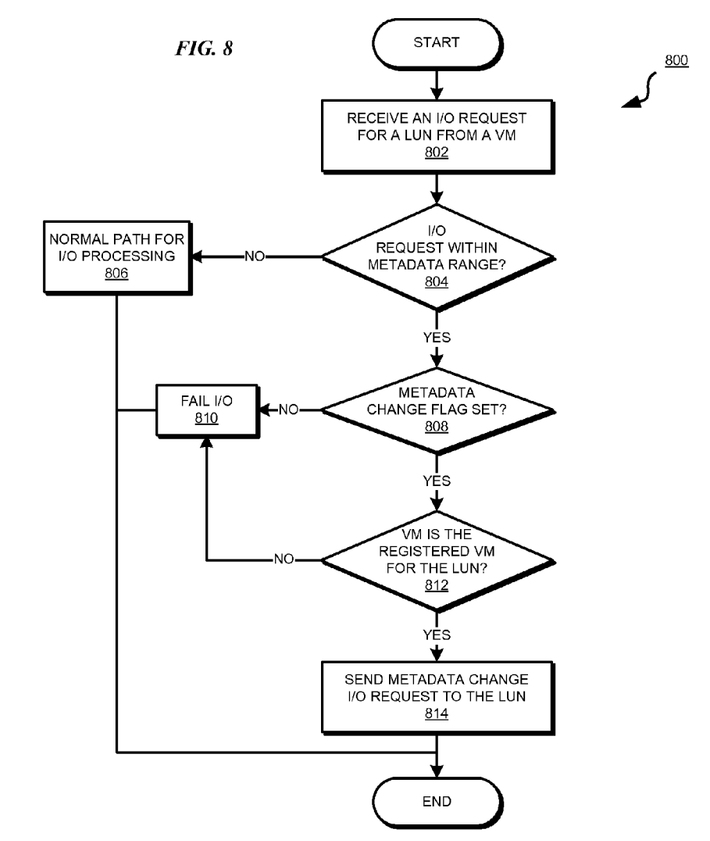
FIG. 8 depicts a flowchart of a process of performing safe management of data storage using a VM in accordance with an illustrative embodiment.

With reference to FIG. 8, this figure depicts a flowchart of a process of performing safe management of data storage using a VM in accordance with an illustrative embodiment. Process 800 can be implemented in a VM identification application, such as service 105 in FIG. 1, service 410 of FIG. 4, or service 610 in FIG. 6.

A VM identification application (service) receives an I/O request from a VM (block 802). The service determines whether the I/O request seeks to manipulate data within a signature's address range according to a signature metadata (block 804). For example, in one embodiment, the service makes this determination by performing a lookup in monitor table 616 in storage subsystem 602 in FIG. 6. In another embodiment, the service makes this determination by performing a lookup in cached monitor table 622 in cache 620 in data processing system 604 in FIG. 6. If the I/O request's address block falls within a signature's address range according to the monitor table lookup, then the service determines that the I/O request is seeking to manipulate data within a signature's address range.

If the I/O request's address range is distinct from a signature's address range ("No" path of block 804), the service allows the I/O request to proceed along the normal path of I/O processing (block 806). Process 800 ends thereafter.

If the I/O request's address range overlaps with a signature's address range ("Yes" path of block 804), the service determines whether a flag in the I/O request indicates an intention for changing the signature (block 808). If the flag is not set, to with, the I/O request's address range overlaps a signature's address range, but the I/O request is not intended to change the signature ("No" path of block 808), the service fails the I/O request (block 810). Process 800 ends thereafter.

If the flag is set to indicate an affirmative intention for the I/O request to change a signature ("Yes" path of block 808), the service further determines whether the VM from where the I/O request was received in block 802 is the registered VM for the LUN on which the signature is to be changed (block 812).

If the VM is not the registered VM for the LUN ("No" path of block 812), the service fails the I/O request at block 810 and process 800 ends thereafter.

If the VM is the registered VM of the LUN ("Yes" path of block 812), the service sends the I/O request for the signature change to the LUN (block 814). Process 800 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a method, system, and computer program product are provided in the illustrative embodiments for safe management of data storage using a VM. Although some embodiments are described with respect to multiple VMs, an embodiment can be practiced with just one VM, such as when a VM accidentally attempts to overwrite its own signature. An embodiment can be used to avoid corrupting another VM's signature or a VM's own signature on a LUN.

An embodiment can be used to selectively scrutinize some I/O request or all I/O requests in the manner described herein. When I/O performance is insignificant, or when the I/O performance degradation is acceptable in exchange of the additional protection, all I/O requests can be processed via a VM identification application in the manner described herein.

An embodiment can be configured to target only real disks and exclude logical disks where signature metadata cannot be controlled by a VM. For example, a real disk or LUN can set an additional flag on a corresponding device driver structure. Such a flag, e.g., VM_DISK, can indicate that a VM can potentially place a signature on the disk. A VM identification application can test for this flag before attempting process 800 in FIG. 8.

In another embodiment, a VM identification application can limit which nodes from a node list can manipulate a signature. In other words, a VM may be allowed to overwrite a signature only from some nodes in a cluster and not from others. Nodes with distinct authorizations can be distinguished in a monitor table using additional attributes.

An embodiment overcomes the deficiency in SCSI-2 and SCSI-3 reservation schemes. A SCSI reservation scheme only limits access to a disk from a particular node, but does not distinguish between different VMs executing on the same node that may accidentally overwrite each other's signatures. A SCSI reservation scheme also does not have protections built-in for preventing an accidental overwrite of a VM's own signature, even though the VM is executing on an authorized node. An embodiment described herein addresses these and other shortfalls in the presently available data storage safeguards, and offer improved safety in data storage operations.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) having computer readable program code embodied thereon.

Any combination of one or more computer readable storage device(s) may be utilized. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device.

The term "computer-readable storage device" does not encompass a signal propagation media such as a copper cable, optical fiber or wireless transmission media.

Program code embodied on a computer readable storage device may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices that can direct one or more computers, one or more other programmable data processing apparatuses, or one or more other devices to function in a particular manner, such that the instructions stored in the one or more computer readable storage devices produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for safe management of a data storage using a volume manager (VM), the method comprising:
    a computer receiving an input/output (I/O) request from the VM, wherein the VM comprises an application to manage read/write access to a data storage volume comprising a portion of the data storage, wherein the data storage is accessible to a plurality of data processing systems and a plurality of VMs, and wherein the VM writes a VM signature on the data storage volume to manage the data storage volume such that corrupting the VM signature is disruptive of the management of the data storage volume by the VM;
    the computer determining whether the I/O request requests a data manipulation on the data storage in an address range that overlaps with an address range of the VM signature stored on the data storage;
    the computer, responsive to determining that the address range of the data manipulation overlaps with the address range of the VM signature, determining whether an identifier of the VM matches an identifier of a second VM associated with the VM signature; and
    the computer, responsive to determining that the identifier of the VM does not match the identifier of the second VM, failing the I/O request, thereby preventing an unsafe overwriting of the VM signature on the data storage.

2. The method of claim 1, further comprising:
    the computer receiving a second I/O request;
    the computer determining that an address range of a data manipulation requested by the second I/O request overlaps with the address range of the VM signature;
    the computer determining whether the second I/O request includes an indication that the second I/O request is intended to overwrite the VM signature;
    the computer, responsive to determining that the I/O request does not include the indication, failing the second I/O request.

3. The method of claim 1, further comprising:
    the computer receiving a second I/O request;
    the computer determining that an address range of a data manipulation requested by the second I/O request does not overlap with the address range of the VM signature; and the computer processing the second I/O request through normal I/O process.

4. The method of claim 1, further comprising:
the computer receiving a registration from the VM;
the computer determining, using the registration, signature metadata associated with the VM;
the computer recording the signature metadata on the data storage.

5. The method of claim 4, wherein the recording comprises:
the computer recording the signature metadata in a table on a storage subsystem associated with the data storage; and
the computer updating a copy of a portion of the table existing in a memory associated with the computer.

6. The method of claim 1, wherein the method is performed by a VM identification service executing in a kernel space of the computer.

7. The method of claim 1, wherein the data storage is a volume identified by a logical unit number (LUN) in signature metadata, and wherein the VM manages the LUN.

8. The method of claim 7, wherein the VM signature is a signature of a different VM than the VM that also manages the LUN.

9. The method of claim 7, wherein the signature metadata further includes an identifier for the VM and an identifier for the LUN.

10. The method of claim 7, wherein the signature metadata further includes a list of nodes from where the VM can manage the LUN.

11. The method of claim 1, further comprising the computer deducing the address range of the signature from signature metadata, the signature metadata including a location and a size of the VM signature on the data storage.

12. A computer program product comprising one or more computer-readable tangible storage devices and computer-readable program instructions which are stored on the one or more storage devices and when executed by one or more processors, perform the method of claim 1.

13. A computer system comprising one or more processors, one or more computer-readable memories, one or more computer-readable tangible storage devices and program instructions which are stored on the one or more storage devices for execution by the one or more processors via the one or more memories and when executed by the one or more processors, perform the method of claim 1.

14. A computer program product for safe management of a data storage using a volume manager (VM), the computer program product comprising:
one or more computer-readable tangible storage devices;
program instructions, stored on at least one of the one or more storage devices, to receive an input/output (I/O) request from the VM, wherein the VM comprises an application to manage read/write access to a data storage volume comprising a portion of the data storage, wherein the data storage is accessible to a plurality of data processing systems and a plurality of VMs, and wherein the VM writes a VM signature on the data storage volume to manage the data storage volume such that corrupting the VM signature is disruptive of the management of the data storage volume by the VM;
program instructions, stored on at least one of the one or more storage devices, to determine whether the I/O request requests a data manipulation on the data storage in an address range that overlaps with an address range of the VM signature stored on the data storage;
program instructions, stored on at least one of the one or more storage devices, to, responsive to determining that the address range of the data manipulation overlaps with the address range of the VM signature, determine whether an identifier of the VM matches an identifier of a second VM associated with the VM signature; and
program instructions, stored on at least one of the one or more storage devices, to, responsive to determining that the identifier of the VM does not match the identifier of the second VM, fail the I/O request, thereby preventing an unsafe overwriting of the VM signature on the data storage.

15. The computer program product of claim 14, further comprising:
program instructions, stored on at least one of the one or more storage devices, to determine whether the I/O request includes an indication that the I/O request is intended to overwrite the VM signature; and
program instructions, stored on at least one of the one or more storage devices, to, responsive to determining that the I/O request does not include the indication, fail the I/O request, thereby preventing the unsafe overwriting of the VM signature on the data storage.

16. The computer program product of claim 14, further comprising:
program instructions, stored on at least one of the one or more storage devices, to process the I/O request through normal I/O processing responsive to determining that the address range of the data manipulation does not overlap with the address range of the VM signature.

17. The computer program product of claim 14, further comprising:
program instructions, stored on at least one of the one or more storage devices, to receive a registration from the VM;
program instructions, stored on at least one of the one or more storage devices, to determine, using the registration, signature metadata associated with the VM;
program instructions, stored on at least one of the one or more storage devices, to record the signature metadata on the data storage.

18. The computer program product of claim 14, wherein the program instructions to receive the I/O request, the program instructions to determine whether the I/O request requests the data manipulation, the program instructions to determine whether the identifier of the VM matches the identifier of the second VM, and the program instructions to fail the I/O request are stored in at least one of the one or more computer-readable tangible storage devices in a data processing system, and wherein the program instructions to receive the I/O request, the program instructions to determine whether the I/O request requests the data manipulation, the program instructions to determine whether the identifier of the VM matches the identifier of the second VM, and the program instructions to fail the I/O request are transferred over a network from a remote data processing system.

19. The computer program product of claim 14, wherein the program instructions to receive the I/O request, the program instructions to determine whether the I/O request requests the data manipulation, the program instructions to determine whether the identifier of the VM matches the identifier of the second VM, and the program instructions to fail the I/O request are stored in at least one of the one or more computer-readable tangible storage devices in a server data processing system, and wherein the program instructions to receive the I/O request, the program instructions to determine whether the I/O request requests the data manipulation, the program instructions to determine whether the identifier of the VM matches the identifier of the second VM, and the program instructions to fail the I/O request are downloaded over a network to a remote data processing system for use in a computer-readable tangible storage device associated with the remote data processing system.

20. A computer system for safe management of a data storage using a volume manager (VM), the computer system comprising:

one or more processors, one or more computer-readable memories and one or more computer-readable tangible storage devices;

program instructions, stored on at least one of the one or more storage devices for execution by at least one of the one or more processors via at least one of the one or more memories, to receive an input/output (I/O) request from the VM, wherein the VM comprises an application to manage read/write access to a data storage volume comprising a portion of the data storage, wherein the data storage is accessible to a plurality of data processing systems and a plurality of VMs, and wherein the VM writes a VM signature on the data storage volume to manage the data storage volume such that corrupting the VM signature is disruptive of the management of the data storage volume by the VM;

program instructions, stored on at least one of the one or more storage devices for execution by at least one of the one or more processors via at least one of the one or more memories, to determine whether the I/O request requests a data manipulation on the data storage in an address range that overlaps with an address range of the VM signature stored on the data storage;

program instructions, stored on at least one of the one or more storage devices for execution by at least one of the one or more processors via at least one of the one or more memories, to, responsive to determining that the address range of the data manipulation overlaps with the address range of the VM signature, determine whether an identifier of the VM matches an identifier of a second VM associated with the VM signature; and program instructions, stored on at least one of the one or more storage devices for execution by at least one of the one or more processors via at least one of the one or more memories, to, responsive to determining that the identifier of the VM does not match the identifier of the second VM, fail the I/O request, thereby preventing an unsafe overwriting of the VM signature on the data storage.

* * * * *